US012587387B2

(12) United States Patent
Wuest et al.

(10) Patent No.: US 12,587,387 B2
(45) Date of Patent: Mar. 24, 2026

(54) PROTECTING WEBCAM VIDEO FEEDS FROM VISUAL MODIFICATIONS

(71) Applicant: Acronis International GmbH, Schaffhausen (CH)

(72) Inventors: Candid Wuest, Bassersdorf (CH); Serg Bell, Costa del Sol (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 176 days.

(21) Appl. No.: 18/473,717

(22) Filed: Sep. 25, 2023

(65) Prior Publication Data

US 2025/0106039 A1     Mar. 27, 2025

(51) Int. Cl.
*H04L 9/32* (2006.01)
*G06V 20/40* (2022.01)
*H04L 9/14* (2006.01)

(52) U.S. Cl.
CPC ............ *H04L 9/3247* (2013.01); *G06V 20/46* (2022.01); *H04L 9/14* (2013.01)

(58) Field of Classification Search
None
See application file for complete search history.

(56) References Cited

U.S. PATENT DOCUMENTS

| | | | |
|---|---|---|---|
| 10,176,309 | B2 | 1/2019 | Tormasov et al. |
| 11,075,744 | B2 | 7/2021 | Tormasov et al. |
| 11,449,584 | B1 | 9/2022 | Pamucci |
| 11,711,555 | B1 * | 7/2023 | Sendurpandian ..... H04L 9/0861 |
| | | | 725/31 |
| 11,770,260 | B1 * | 9/2023 | Pamucci ............ H04N 21/8358 |
| 2010/0177891 | A1 | 7/2010 | Keidar et al. |
| 2011/0128445 | A1 * | 6/2011 | Carrieres ............... H04N 17/00 |
| | | | 348/E9.034 |

(Continued)

OTHER PUBLICATIONS

Atrey, P.K., Yan, W.Q. and Kankanhalli, M.S., 2007. A scalable signature scheme for video authentication. Multimedia Tools and Applications, 34(1), pp. 107-135. (Year: 2007).*

(Continued)

*Primary Examiner* — Luu T Pham
*Assistant Examiner* — Edward X Long
(74) *Attorney, Agent, or Firm* — ESPE Legal Consultancy FZ-LLC

(57) ABSTRACT

Systems and methods for safeguarding the authenticity and integrity of a real-time video feed generated by a webcam. A video frame includes a sequence of frame images and key frames within the sequence. A method includes generating the video feed by the webcam at a first computing device, identifying a key frame [kf] in the video feed, digitally signing the key frame [kf] using a private key of a private key-public key pair, embedding the digitally signed key frame [kf] in the video feed, transmitting the video feed to second computing device, identifying the next key frame [kf+1] in the video feed, and determining a similarity value of the next key frame [kf+1] and the key frame [kf] to determine whether to digitally sign and embed the digitally signed key frame [kf+1] in the video feed.

20 Claims, 4 Drawing Sheets

(56) References Cited

U.S. PATENT DOCUMENTS

2017/0104957 A1 * 4/2017 Farrell .................. H04N 7/147
2023/0319285 A1 * 10/2023 Shanmugam ........ H04N 19/136

OTHER PUBLICATIONS

Ahmed, F. and Siyal, M.Y., Jul. 2007, A robust and secure signature scheme for video authentication. In 2007 IEEE International Conference on Multimedia and Expo (pp. 2126-2129). IEEE. (Year: 2007).*

* cited by examiner

System 100

First Computing Device 101

Second Computing Device 116

First Processing Unit 102

First Memory 104

Video Capturing Device 106

TPM 108

Video Conferencing Platform 110

First Communication Module 112

Adjustable Setting Module 114

Network 115

Second Processing Unit 118

Second Memory 120

Signature Verification Module 122

Video Conferencing Platform 110

Second Communication Module 124

PROTECTING WEBCAM VIDEO FEEDS FROM VISUAL MODIFICATIONS

TECHNICAL FIELD

The present disclosure generally relates to the field of video conferencing and video stream security. More specifically, the present disclosure relates to the detection and prevention of video stream tampering, particularly through deep fake video feeds, in real-time communication systems.

BACKGROUND

Video cameras, including built-in webcams for laptops and external USB cameras, have become essential tools for modern work processes, facilitating video conference calls through virtual communication platforms, such as Microsoft Teams, Zoom, or Webex. The virtual communication platforms can be utilized for crucial activities, such as remote diagnostics by doctors, discussions of proposals by politicians, and passport holder ID verification by financial institutions.

However, the advent of generative AI tools, capable of modifying the appearance of people in video streams in real-time, has raised significant security concerns. Generative AI tools can generate deep fake video feeds, enabling attackers to impersonate others realistically during a video call by using previously recorded video footage as base images and creating fake versions of original speakers in the video. The impersonation can include a digital clone of the voice pattern, and even low-effort versions can create deep fake videos beforehand and replay sequences when needed. Such AI tools can also be used to bypass life tests, such as passport verification systems requiring real-time hologram display by tilting the passport.

While video modifications can include harmless changes like virtual backgrounds or eye focus adjustment, it is of utmost importance for sensitive meetings to reliably determine whether a video feed has been tampered with. For instance, changing background, initially seems like a harmless act, but such modifications can cause false impressions of the whereabouts of the presenting party, which can be a critical aspect of a sensitive meeting. Changing facial features, impersonating someone else, and such alteration techniques can gravely endanger sensitive meetings. Existing solutions, such as end-to-end encryption of video streams, TLS encrypted communication, and signing individual image frames with asymmetric encryption, provide certain levels of protection against unauthorized access and tampering, but do not offer a comprehensive solution.

Some CCTV cameras use end-to-end encryption to prevent unauthorized viewing of the video stream and to stop attackers from injecting their own video feed. For example, an attacker might inject a video feed showing an empty room to hide their presence while accessing a building. In an example, asymmetric encryption can be used to store keys on a dedicated crypto hardware chip on the device. While an asymmetric encryption key is effective in preventing unauthorized viewing and video feed injection, such a key does not offer protection against tampering by authorized users. Also, an asymmetric encryption key does not specifically address the challenges of detection or prevention of deep fakes or other sophisticated forms of video tampering, such as modifying the appearance of a person during a live video conference.

Lower protection versions for video streams use Transport Layer Security (TLS) encrypted communication, which encrypts the traffic while in transit. TLS encrypted communication only encrypts the data while in transit and does not provide full authenticity or protection against tampering. TLS encrypted communication therefore safeguards the data from being intercepted during transmission but does not protect against tampering before transmission or allow for verification of the authenticity of the video content.

Typically, most webcams do not protect the video stream from tampering, as vendors themselves offer tools to add virtual backgrounds or adjust digital white balance, and such. The availability of vendor-provided tools for video modification makes it easier for attackers to tamper with the video feed. However, it is difficult for verification tools to differentiate between legitimate modifications (e.g., virtual backgrounds) and malicious tampering (e.g., deep fake impersonation).

Furthermore, some systems use generative AI to predict whether a person visible in a photo or video has been generated by AI or not. As the capabilities of generative AI increase, it is becoming more difficult to differentiate between real and AI-generated images or videos. Advanced generative AI tools can create highly realistic images and videos, making it challenging for AI prediction systems to accurately identify deep fakes or other forms of AI-generated content.

Therefore, there is a clear need to automatically detect tampering and provide clarity for the receiving party of a video feed in order to ensure the authenticity and integrity of video feeds in real-time communication systems.

SUMMARY

Embodiments described or otherwise contemplated herein substantially meet the aforementioned needs of the industry. The present disclosure relates to systems and methods for protecting the authenticity and integrity of a video feed generated by a video capturing device in real-time. The video feed includes a sequence of frame images and a plurality of key frames, each containing an entire image segment. The video frames are digitally signed prior to the video transmission at the origin of the video. Subsequently, the authenticity of the frames is determined by verifying the digital signature, thereby protecting the integrity of the video feed.

The method, in accordance with an embodiment, involves generating the video feed at a first computing device, identifying key frames, digitally signing the key frames using a unique private key-public key pair associated with the video capturing device, and embedding the digitally signed key frames in the video feed. The similarity between successive key frames is assessed, and subsequent key frames are digitally signed and embedded only if the similarity value is below a predefined threshold.

In one aspect, the method is repeated until the video feed is ended.

In one aspect, if the similarity value of the next key frame [kf+1] and the key frame [kf] is above the predefined threshold value, the method includes identifying a next-to-next key frame [kf+2] in the video feed, determining a similarity value of the next-to-next key frame [kf+2] and the key frame [kf]. If the similarity value is below the predefined threshold, then the method includes digitally signing the further key frame [kf+2] using a private key in a private key-public key pair unique to the video capturing device as a digitally signed key frame, and embedding the digitally signed key frame [kf+2] in the video feed.

According to another aspect, if the similarity value of the next key frame [kf+1] and the key frame [kf] is above the predefined threshold value, the required method operations are repeated for the next key frame [kf+1] as the key frame [kf].

In accordance with yet another aspect, the embedding includes incorporating the digitally signed key frame [kf] into metadata of the video feed or the key frame [kf] itself.

In one aspect, the method includes locating the digitally signed key frame within the video feed, extracting the public key from the private key-public key pair from the digitally signed key frame, and verifying the digital signature of the digitally signed key frame using the public key. The private key-public key pair is unique to the video capturing device hardware.

In one aspect, the key frame [kf] is identified by using a library of a user appearance profile and a trigger event. The trigger event includes the user's first appearance, a timer, the user's voice detection, turning on video capturing device in a conference call, a trigger of the video conferencing platform, a randomly selected time interval from the start, to make predicting and attacking it harder.

In one aspect, the method includes repeating the required operations until a predefined counter reaches the maximum limit.

In one aspect, the similarity value is determined by using computer vision techniques, such as Structural Similarity Index (SSI), Mean Squared Error (MSE), Histogram Comparison, Template Matching, and Feature matching techniques, such as SIFT (Scale-Invariant Feature Transform) and SURF (Speeded-Up Robust Features), Deep learning Convolutional Neural Networks (CNN).

In one aspect, the predefined threshold is defined based on at least one of security settings of the video conference tool, personal settings of the user, such as user-defined threshold, current computational load, specific security requirements of the application, feedback from initial testing and user experience, nature of the conference call, and request from the other participants through the video conferencing platform.

In one aspect, the predefined threshold value is dynamically defined by a machine learning techniques based on at least one of available memory resources within the system, current utilization of system resources, processing speed and latency requirements, security settings of the video conference platform, personal settings of the user, specific security requirements of the application, feedback from initial testing and user experience, characteristics of the image, and available network bandwidth.

In one embodiment, the present disclosure relates to the system including a video capturing device, a Trusted Platform Module (TPM) integrated with the video capturing device, a communication module, and a signature verification module. The TPM securely stores the unique private key-public key pair, identifies key frames, digitally signs the key frames, and embeds them in the video feed. The signature verification module identifies subsequent key frames, determines the similarity value between successive key frames, and decides on the signing and embedding of subsequent key frames based on the predefined threshold. The system further includes an adjustable settings module for modifying the frequency of signed frames, the embedding method, and the predefined similarity threshold. The predefined threshold value can be dynamically defined based on various factors, such as available memory resources, current system utilization, processing speed and latency requirements, security settings of the video conference platform, personal user settings, specific application security requirements, initial testing and user experience feedback, image characteristics, and available network bandwidth. The second computing device comprises a plugin or an integrated module within a video conferencing platform configured to process and verify the digitally signed key frames from the video feed. The object of the invention is to ensure the authenticity and integrity of video feeds in real-time communication systems by preventing unauthorized viewing, video feed injection, and other forms of video tampering.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

Figure 1A:
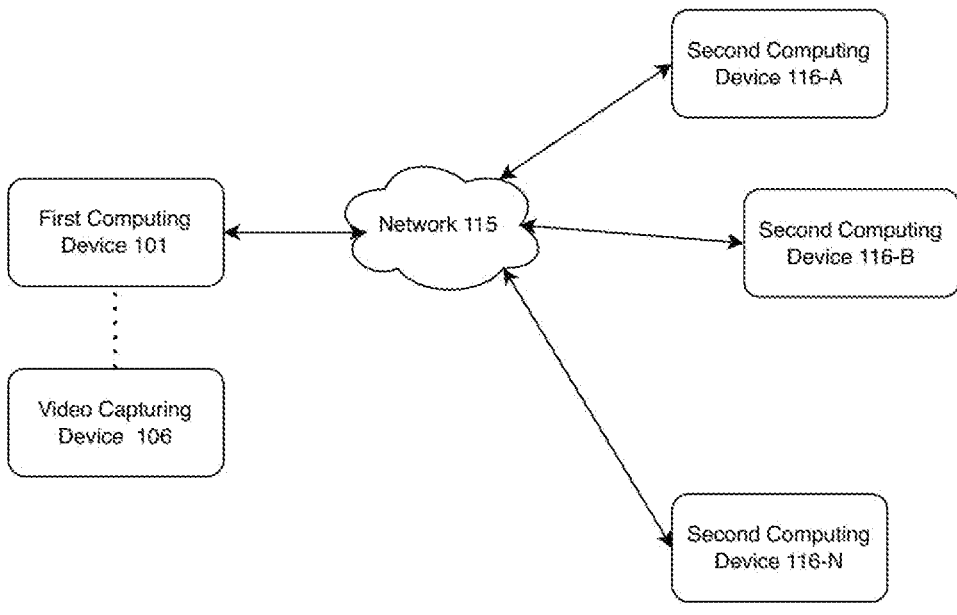
FIG. 1A is a block diagram of a system for protecting a video feed generated in real-time, in accordance with an embodiment.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

Embodiments described herein relate to the field of video conferencing and video stream security. More specifically, embodiments are directed to the detection and prevention of video stream tampering, particularly through deep fake video feeds, in real-time communication systems used for critical activities, such as remote diagnostics, political discussions, and passport verification. The present disclosure relies on identifying key frames of the video feed generated by a webcam and digitally signing the key frames. Upon verifying the key frames by a video receiving party, the authenticity and integrity of the video is determined.

FIG. 1A is a block diagram of a system for protecting a video feed generated by a webcam (e.g. video capturing device 106) in real-time, thereby protecting the video feed from unauthorized alterations by AI. In embodiments, as will be described, the system is configured to protect a video feed by determining the authenticity and integrity of the video feed. In embodiments, the system is implemented on at least two computing devices, referred to as first computing device 101 and second computing device 116.

In one aspect, the first computing device 101 is the primary hardware platform configured for generating a video feed using an integrated video capturing device 106. The first computing device 101 is particularly configured for capturing, processing, and initiating the video feed, which subsequently undergoes measures to ensure its authenticity and integrity as described in the present disclosure. The examples of the first computing device 101 includes, but are not limited to, a laptop, desktop computer, tablet, mobile phone, personal digital assistant (PDA), mobile email device, or even a television with embedded or connected processors. The first computing device 101 is operably coupled to a network 115 and configured to interact with a server or a data repository within the network 115. In one illustration, the first computing device 101 can be a user device of a user recording a video. At this example, the user can access a video communication platform, such as WebEx, Zoom, and the like, and generate a video content through the video communication platform using video capturing device 106 or generate the video directly using the video capturing device 106 and then transmit the generated video through the video communication platform.

In one aspect, the first computing device 101 is integrated with the video capturing device 106, such as a webcam integrated with a laptop. In another aspect, the first computing device 101 is coupled to an external video capturing device 106, such as a USB portable digital camera coupled to the laptop. Additional examples of the video capturing device 106 can include, but are not limited to a digital camera, a smartphone with integrated cameras and coupled to the first computing device 101, cam-recorders, and the like. For clarity and brevity of the disclosure, the present embodiment is described with an example of a webcam as video capturing device 106. The webcam is a hardware component configured for capturing high-quality video in real-time and transmitting it to the first computing device 101. The captured video is then utilized for various applications, including video conferencing, online streaming, content creation, and security surveillance. The webcam can be equipped with image sensors and related visioning capabilities and may be connected to the first computing device 101 via USB or other compatible interfaces.

As shown in FIG. 1A, the first computing device 101 is connected with one or more second computing devices 116-A, 116-B, 116-N (referred to for simplicity as 116) over the network 115. The second computing device 116 is configured for receiving and interacting with the video content transmitted from the first computing device 101. The examples of the second computing device 116 include, but may not be limited to, laptops, desktop computers, tablets, smartphones, smart TVs, or any device equipped with the necessary hardware and software capabilities to receive and interact with video data. The second computing device 116 is primarily configured to receive, process, and present the video content to a user of the second computing device 116. The second computing device 116 establishes a communication channel with the first computing device 101, through the network 115, allowing for the streaming or transfer of the video content.

The network 115, in one aspect, can be wired or wireless, and can have numerous different configurations including a star configuration, token ring configuration or other configurations. Furthermore, the network 115 can include, but may not be limited to, a local area network (LAN), a wide area network (WAN) (e.g., the Internet), and/or other interconnected data paths across which multiple devices may communicate. In some embodiments, the network 115 can be a peer-to-peer network. The network 115 can also be coupled to or include portions of a telecommunications network for sending data in a variety of different communication protocols. In some embodiments, the network 115 can include a Bluetooth communication network or a cellular communications network for sending and receiving data including short messaging service (SMS), multimedia messaging service (MMS), hypertext transfer protocol (HTTP), direct data connection, WAP, email, and the like.

Figure 1B:
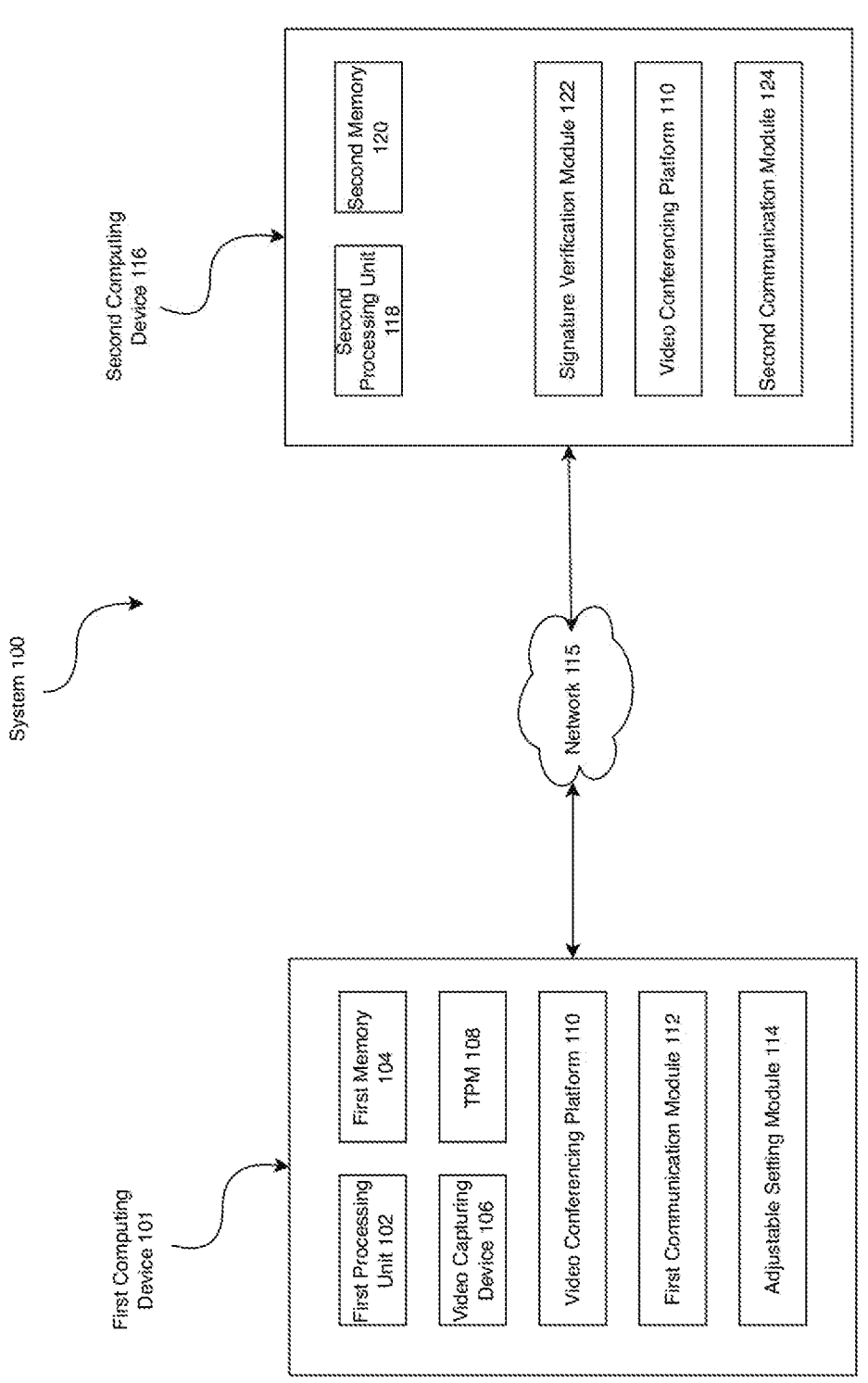
FIG. 1B is a functional block diagram of the system for protecting a video feed generated in real-time, in accordance with an embodiment.

FIG. 1B is a functional block diagram of a system 100 for determining the authenticity and integrity of a video feed generated by the video capturing device 106 in real-time, thereby protecting the video feed from unauthorized alterations by AI, in accordance with one embodiment. FIG. 1B illustrates functional components of the first computing device 101 and the second computing device 116.

The first computing device 101, as shown in FIG. 1B, includes a first processing unit 102, a first memory 104, a video capturing device 106, a Trust Platform Module 108, a video conferencing platform 110, a first communication module 112, and an adjustable setting module 114. The second computing device 116 includes a second processing unit 118, a second memory 120, a signature verification module 122, a video conferencing platform 110, and a second communication module 124.

In one aspect, the first processing unit 102 is configured to manage functioning of the first computing device 101. The second processing unit 118 is configured to manage functionality of the second computing device 116. For sake of brevity of the present disclosure, the first processing unit 102 and the second processing unit 118 are described combinedly, and referred to as a processing unit when referred in combination in view of FIG. 1B. The processing unit executes software instructions by performing various input/output, logical, and/or mathematical operations. It can be represented by various computing architectures to process data signals, including complex instruction set computer (CISC), reduced instruction set computer (RISC), or a combination of instruction sets. The processing unit can be physical and/or virtual, featuring either a single processing unit or a plurality of processing units and/or cores. In some implementations, the processing unit is capable of generating and providing electronic display signals to a display device, facilitating the display of user interfaces for tasks like user requests for video content, content identification, and delivery. Additionally, the processing unit can be connected to the memory via a bus, enabling access to data and instructions while also serving as a conduit to other system components.

In one aspect, the first computing device 101 includes the first memory 104, and the second computing device 116 includes the second memory 120. For sake of brevity of the present disclosure, the first memory 104 and the second memory 120, combinedly referred to as a memory, and the memory is described in view of FIG. 1B. The memory serves as the data repository and provides access to data for other system components. The memory stores instructions and/or data that can be executed by the processing unit, including code for executing the described techniques. For instance, the memory can store the video processing platform. The memory is also equipped to store various other instructions and data, such as an operating system, hardware drivers, software applications, and databases. The memory communicates with the processing unit and other system components through the shared bus. The memory can include one or more non-transitory computer-usable devices, such as dynamic random access memory (DRAM), static random access memory (SRAM), embedded memory devices, discrete memory devices (e.g., PROM, EPROM, ROM), hard disk drives, optical disk drives (CD, DVD, Blu-ray™, etc.), and other tangible storage apparatuses capable of containing, storing, communicating, or transporting instructions, data, computer programs, software, code, routines, and the like.

In one aspect, the first computing device 101 includes the video capturing device 106, as described with reference to FIG. 1A. The video capturing device 106, such as a webcam, are integrated with the first computing device 101, in one implementation. In another implementation, the video capturing device 106 is externally coupled to the first computing device 101. For example, the user of the first computing device 101 may use an integrated camera of his smartphone which is connected to the first computing device 101 as the video capturing device 106. When a video recording is initiated, the integrated camera can capture the video of the meeting and transfer the video content to the first computing device 101.

In one aspect, the video capturing device 106 includes a Trusted Platform Module (TPM 108). The TPM 108 is a component integrated with the video capturing device 106 to enhance hardware security by incorporating cryptographic keys and data signing. The TPM 108 is configured for verifying a user's identity and authenticating the connected user devices. Thereby, the TPM 108 can also provide protection against various threats, including firmware and ransomware attacks.

In one example, the computing devices 101 and/or 116 can create security and authentication policies based on information that reflects the implemented data security. For instance, the policies can require that a requesting device complies with specific criteria. To enforce the specific criteria, in one aspect, the TPM 108 can implement cryptographic methods using attestations. The attestations serve as cryptographic evidence and are cryptographically verifiable as authentic. If an attestation is verified as authentic, the system 100 examines the information within the attestation to determine if the request aligns with the policy's requirements. Depending on whether the request complies with the policy, the system 100 takes appropriate actions, such as granting or denying the request. Once the requesting device, i.e., the computing device, is verified, the TPM 108 inserts digital signatures within the video content and transmits the video content to the requesting device. Any computing device receiving the video content cryptographically verifies the authenticity of the attestation, for example, by digital signature, using the provided certificate. This verification process includes confirming the certificate's authenticity, such as verifying that it was issued by a legitimate certificate authority. With verification of the digital signature, the legitimacy of the video content can be verified.

In accordance with an embodiment, each video capturing device 106 is manufactured to have a random private key-public key pair, randomly generated during the manufacturing process, and added to the video capturing device 106 by the hardware vendor. For example, Logitech.

During the manufacturing process, a private key, from the private key-public key pair, is generated through cryptographic algorithms that ensure that the private key is unique and random. Once generated, the private key is securely stored in the TPM 108. The private key is inaccessible to external entities, meaning the private key cannot be extracted or used by any unauthorized individuals or systems, thus safeguarding it from potential breaches.

The public key is created to work in tandem with the private key. The public key can be freely distributed and used to encrypt data that can only be decrypted by the corresponding private key, thereby facilitating secure communications.

In one aspect, along with the generation of the private key public key pair, the hardware vendor (e.g., Logitech) can provide a digital certificate, verifying the public key so that users can verify that this public key belongs to this particular hardware vendor. By associating each public key with the correct video capturing device 106, a trusted origin for the keys can be ensured.

Referring back to FIG. 1B, the video capturing device 106, i.e., a webcam, thus generates a video content. The video content is alternatively referred to as a video feed or video stream throughout the present disclosure. The video content can be a video recording in real-time. When the webcam is activated, the webcam starts producing a stream of video that is essentially a series of still images displayed rapidly one after another. The number of frames shown in one second can vary depending on the predefined quality settings. In one example, the frames frequency can be 25 or 30 frames per second.

According to one aspect, within the video content, there are two types of frames used to efficiently render the video; first, key frames, and second, differential frames. Key frames contain the complete image data for a particular moment in time, acting as reference points for the subsequent frames. Differential frames, which occur between key frames, only contain data for the parts of the image that have changed since the last frame. The approach of identifying two types of frames significantly reduces the video size as it avoids redundant data storage.

In one aspect, the webcam is configured to select one key frame at regular intervals (e.g., every 5 seconds) for digital signing. The interval is predefined in the webcam settings. As described with reference to the TPM 108, to digitally sign a key frame, a cryptographic hash of the frame's data is created using a hash function, such as SHA-256. The hash is then signed using the private key stored securely in the TPM 108 associated with the webcam, effectively embedding a unique signature in the key frame that verifies the authenticity and integrity of the key frame.

Depending on the characteristics of the video format and related considerations, such as potential compression algorithms applied during transmission, different strategies are utilized for embedding the digital signature into the key frame. In one example, the digital signature can be incorporated into the video stream's metadata, an area used to store additional information about the video data. The metadata includes, but is not limited to, a hardware ID, a timestamp, a frame number, setting parameters, a public key, and the like. The hardware ID can be an indicator of the specific webcam utilized in recording the video, aiding in tracing the origin of the content. The hardware ID enhances security by allowing for the verification of the hardware used in content creation. The timestamp is configured to denote the precise time of recording for each frame, offering a chronological verification of the content. The timestamp protects the video content against tampering through time manipulation, ensuring the chronological integrity of the video stream. The frame numbers can be added to maintain the correct sequence of frames, preventing potential manipulation through reordering. The frame numbers safeguard against replay attacks where frames can be re-sent in a different order to manipulate the video's narrative. The setting parameters indicate the settings pertaining to the frequency of signed key frames, aiding the receiver in knowing what to anticipate in terms of security protocols.

The public key can identify unequivocally the entity to which the webcam belongs, fostering trust and security in communications.

In one aspect, the video content is represented by the stream of frames. All frame identification, processing, and signing tasks are carried out by the webcam hardware. The settings parameters define the frequency of signed frames and how the signed frames are embedded. In one example, the frequency can also be set to zero, which indicates that the feature is disabled completely. The video stream with the signed key frames then leaves the webcam hardware and is transmitted to the first computing device 101, and to the second computing device 116 from the first computing device 101. Transmission of the video content from the first computing device 101 to the second computing device 116 is performed by the video conferencing platform 110. The video conferencing platforms 110 are the tools enabling video communication between two or more entities. The examples of the video conferencing platform 110 include, but are not limited to, Microsoft Teams, Webex, Zoom, GoToMeeting, Google Meet, or other such similar platforms. In one implementation, the video conferencing platform 110 can be implemented as a plug-in or an application. The user of the first computing device 101 can access the video conferencing platform 110 and connect virtually with the other user of the video conferencing platform 110 through the network 115.

Through the video conferencing platform 110, the video content is then transferred to the other users, which is a video receiving entity, over the second computing device 116. At the second computing device 116, a supplementary application can be implemented. The supplementary application includes, but is not limited to, a plugin for the video conferencing platform 110, a comprehensive integration facilitated by the vendor of the video conferencing platform 110, or a separate plugin configured for duplicating the video content from the conferencing tool to analyze the content further.

The video conferencing platform 110 utilizes respective communication modules of the computing devices to transmit and receive the video content over the network 115. The first computing device 101, in one aspect, includes the first communication module 112. The second computing device 116, in one aspect, includes the second communication module 124. The first communication module 112 and the second communication module 124 are combinedly referred as to a communication unit for ease of explanation herein. The communication unit is a hardware responsible for receiving and transmitting data, establishing connectivity between the processor and external networks, such as network 115 and other processing systems. The communication unit is primarily configured for data reception, data transmission, and facilitating tasks, such as processing video data from the video capturing device 106 and responding to user requests for video content. The communication unit can include physical ports for direct connections to network 115 or wireless transceivers for data exchange using wireless communication methods like IEEE 802.11, IEEE 802.16, Bluetooth®, cellular communications, or other suitable wireless protocols. The communication unit can be integrated into the system 100 and linked to the shared bus.

In one aspect, the video content is displayed on the display device of the computing devices (not shown in FIG. 1A or FIG. 1B). The display device, which can be a liquid crystal display (LCD), light emitting diode (LED), or any similar device, serves the purpose of displaying user interfaces, electronic images, and data as described herein. The display device features binary, monochrome, or multi-color and shade display capabilities. The display device is connected to the bus of the computing device, thereby enabling communication with the processor and other computing device components. Importantly, its inclusion is optional based on the system's specific configuration and purpose.

In one aspect, the first computing device 101 includes an adjustable setting module 114, configured to allow the user to define setting parameters relating to the video content authentication process. For example, setting parameters can include frequency of the frames, predefined threshold for similarity values, user preferences, and such other parameters. The adjustable setting module 114 permits the user to modify various parameters, including the frequency with which frames are signed, the method utilized for embedding digital signatures into the frames, and defining a specific similarity threshold, allowing for a customizable and adaptive system where users can set parameters based on their specific requirements or preferences, adding a layer of flexibility to the system. The setting parameters can include, but are not limited to, the frequency of signed frames, the embedding method for the digital signature, and the predefined similarity threshold.

In one aspect, the second computing device 116 includes the signature verification module 122 configured to access the video stream using valid credentials and determine whether the video stream is authentic or not.

The signature verification module 122 allows the receiving entity of the video content to authenticate the representation of the video content. For example, if the video content relates to the company CEO, the signature verification module 122 will verify the authenticity and integrity of the video content to ensure that the speaker is the CEO and no one else is impersonating the CEO. The signature verification module 122 can employ various methods to determine the authenticity, based on security policies applied to the video content by the webcam. In one aspect, the signature verification module 122 authenticates the video content by verifying the digital signatures on the key frames.

In accordance with the embodiment, the signature verification module 122 identifies a key frame signed with the digital signature from the video content. Upon detecting the key frame, the signature verification module 122 retrieves the public key embedded in the signature data. The public key is then utilized to authenticate the signature initially generated through the private key counterpart from the private key-public key pair. The signature verification module 122 then validates the integrity of the image by confirming the correspondence between the hash function of the key frame data and the signed data, a procedure repeated with each subsequent signed key frame.

According to one aspect, a signature verification module 122 is configured to authenticate successive key frames. As described earlier, the key frames are those frames which indicate a change in the image within the frame. For example, two or more successive key frames will indicate changes in movements or sitting position of a speaker in the video. The differential frames may not exhibit any change in the image. Therefore, utilizing key frames only to determine the potential alteration or tampering of the video content renders a number of frames to be analyzed significantly smaller than the total number of frames. Use of key frames thus increases efficiency of video content verification.

To analyze a successive frame, the signature verification module 122 identifies the next key frame [kf+1] in the video feed. The next key frame [kf+1] can be a successive frame of the key frame [kf]. The signature verification module 122 then determines a similarity value between the next key frame [kf+1] and the key frame [kf]. If the similarity value is below a predefined threshold value, then the signature verification module 122 can digitally sign the next key frame [kf+1] using a private key in a private key-public key pair unique to the webcam as a digitally signed key frame and embed the digitally signed key frame [kf+1] in the video feed.

In one aspect, the similarity between successive key frames and verification on the signing and embedding of a subsequent key frame [kf] is based on the predefined threshold value. The predefined threshold value can be configured by the user depending on the sensitivity of the video content. The system allows, in one aspect, for the predefined threshold value to be dynamically defined based on a series of factors. In an embodiment, factors affecting the threshold value can relate to current resource utilization of the system, the network 115 bandwidth available, an individual user's settings, and feedback from initial testing and user experiences, among others. The predefined threshold represents an adaptive security measure that can maintain optimum performance and security standards.

The signature verification module 122, in one aspect, is further configured to locate and extract the digitally signed key frame [kf] from the stream of data. The signature verification module 122 further extracts the public key that is directly associated with the video capturing device 106 with which the video content has been generated. Using the previously extracted public key, the signature verification module 122 verifies the digital signature attributed to the key frame [kf].

To maintain tracking of the frequency of signed frames, in one aspect, the system employs an internal counter that tallies the number of frames transpiring between signed frames, aligning the counter count with the frequency delineated in the first signed frame. A discrepancy resulting in an extended interval between signed frames triggers an alert to the user, notifying the user of the potential security breach.

In scenarios necessitating heightened security, the system can be configured to scrutinize the frames interspersed between the signed ones. In other words, a similarity metric that represents the extent of alterations in pixel constitution from one frame to the next can be determined. If the similarity metric crosses a predetermined threshold, the user receives a warning, in one aspect. The similarity metric thus provides a robust defensive mechanism against infiltrators attempting to substitute entire video frames, sparing only the signed key frames, a maneuver that yields a flickering video output perceptible to the naked eye, with added alerts augmenting the user's awareness.

Furthermore, in one aspect, the system can corroborate the authenticity of the public key through verification on the vendor's official website, ensuring that the key originates from a legitimate device furnished by the vendor and stands untainted by revocation orders.

Upon successful verification of the video content being received, the signature verification module 122 indicates a secure status to the user, potentially through various means including a green border encasing the video feed displayed on a display screen of the second computing device 116, the incorporation of a watermark bearing a verification tick, or an ancillary window exhibiting a green light coupled with vital signature details, such as the device ID and the manufacturer's name. The supplementary window can also offer a visual of the last authenticated key frame to foster transparency and deter tampering attempts aiming to replace all but the signed frames, ensuring any deviation from the original content remains noticeable.

Contrarily, the discovery of unsigned key frames or encounters with invalid signatures and incongruent metadata, characterized by outdated timestamps or previously viewed frame IDs, prompts the video conferencing platform 110 to react accordingly based on the configured settings. In one aspect, identification of unsigned key frames triggers the display of a warning banner or the absence of a banner entirely, serving to keep the user informed of the verification status dynamically. Such warning ensures a fortified layer of security, safeguarding the integrity and authenticity of the video feed at every point in the video.

In another aspect, the signature verification module 122 incorporates various computer vision and feature matching techniques to effectively scrutinize the video feed. The signature verification module 122 includes Structural Similarity Index (SSI) and Mean Squared Error (MSE) for examining the structural integrity and error metrics, respectively, as well as utilizing methods like histogram comparison and template matching to analyze the image patterns and features. Additionally, the signature verification module 122 is configured with robust feature-matching techniques like scale-invariant feature transform (SIFT) and speeded up robust features (SURF) alongside deep learning through a Convolutional Neural Network (CNN) to facilitate a detailed analysis grounded in machine learning, helping in accurate verification of the video content.

In one aspect, a key frame [kf] can be identified using different techniques. The techniques include, but are not limited to, creating a library that contains a profile depicting the speaker's appearance and leveraging various trigger events, such as the initial appearance of the user in the frame, a set timer, voice detection capabilities, initiating the webcam during a conference call, a specific command from the video conferencing platform 110, or a randomly selected time interval.

In an embodiment, the signature verification module 122 is configured to identify the initial keyframe, which serves as a reference point for the further operations of verification. In a particular example, the library containing the speaker's appearance profile can be used to identify the initial keyframe. The first appearance of the user in the frame or when the user begins speaking can trigger the capture of this initial keyframe, which represents the authentic appearance of the speaker at the start of their participation.

In another example, voice detection can be used to identify the initial keyframe. When the user's voice is detected, this association can be utilized to signal the capturing of the initial keyframe. This ensures that the speaker's authentic appearance is recorded when they begin speaking.

In another example, trigger events like the initial appearance of the user or specific commands can also be employed to identify the initial keyframe. For example, when the user first appears in the frame or when they initiate the webcam during a conference call, this event can trigger the capture of the initial keyframe.

Such techniques, used alone or in combination, allow for the identification of the moment at which the initial keyframe, representing the unaltered appearance of the speaker, should be captured. This initial keyframe serves as the basis for subsequent operations, ensuring the accuracy of video data protection.

In one aspect, an additional layer of security can be introduced by incorporating an identification of any irregular patterns or suspicious sequences in key frame and/or differential frame transitions, which might indicate an attempted breach. The system can also take into account various elements, such as facial expressions, background details, and other discernible attributes to make an informed decision regarding the authenticity of the frames.

According to an embodiment, the system of the present disclosure is at least partially embodied in the form of computer-implemented processes and apparatus for practicing those processes. The disclosed methods are also at least partially embodied in the form of tangible, non-transitory machine-readable storage media encoded with computer program code. The media may include, for example, RAMs, ROMs, CD-ROMs, DVD-ROMs, BD-ROMs, hard disk drives, flash memories, or any other non-transitory machine-readable storage medium, wherein, when the computer program code is loaded into and executed by a computer, the computer becomes an apparatus for practicing the method. When implemented on the processor, the computer program code segments configure the processor to create specific logic circuits. The methods may alternatively be at least partially embodied in a digital signal processor formed of application specific integrated circuits for performing the methods.

Any of the modules and components depicted as being operated by the processor may include any combination of software, firmware, and/or hardware. The software and/or firmware may include computer-executable code, instructions, or the like that may be loaded into the memory for execution by one or more of the processor(s). Any of the components depicted as being stored in data storage may support functionality described in reference to correspondingly named components earlier in this disclosure.

The processor can be configured to access the memory and execute computer-executable instructions loaded therein. For example, the processor(s) may be configured to execute computer-executable instructions of the various program component(s), applications, engines, or the like of the computing device to cause or facilitate various operations to be performed in accordance with one or more embodiments of the disclosure. The processor(s) can include a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) may be capable of supporting any of a variety of instruction sets.

It should further be appreciated that the system can include alternate and/or additional hardware, software, or firmware components beyond those described or depicted without departing from the scope of the disclosure. More particularly, it should be appreciated that software, firmware, or hardware components depicted as forming part of the computing device are merely illustrative and that some components cannot be present or additional components can be provided in various embodiments. While various illustrative program component(s) have been depicted and described as software component(s) stored in data storage, it should be appreciated that functionality described as being supported by the program component(s) can be enabled by any combination of hardware, software, and/or firmware. It should further be appreciated that each of the above-mentioned component(s) can, in various embodiments, represent a logical partitioning of supported functionality. This logical partitioning is depicted for ease of explanation of the functionality and cannot be representative of the structure of software, hardware, and/or firmware for implementing the functionality. Accordingly, it should be appreciated that functionality described as being provided by a particular component can, in various embodiments, be provided at least in part by one or more other component(s). Further, one or more depicted component(s) cannot be present in certain embodiments, while in other embodiments, additional component(s) not depicted can be present and can support at least a portion of the described functionality and/or additional functionality. Moreover, while certain component(s) can be depicted and described as sub-component(s) of another component, in certain embodiments, such component(s) can be provided as independent component(s) or as sub-component(s) of other component(s).

In an aspect, the communication between the user and the system can be facilitated through a communication network. The network can include certain communication protocols, such as TCP/IP, http, https, ftp, and sftp protocols, over one or more communication network. Here, the communication network can be but is not limited to, internet, intranet, wide area network (WAN), local area network (LAN), wireless network, Bluetooth, WiFi, and mobile communication network. The user computing device can be utilized by system users to interact with (e.g., send or receive electronic messages to and from) the electronic system through the network. In some embodiments, the user computing device is a mobile/hand-held device, such as a tablet, iPhone, iPad, Google's Android device, and/or other types of mobile communication device, PC, such as laptop PC and desktop PC, and a server machine.

In order to guarantee the integrity of the visuals, particularly focusing on the individual presenting in the video, embodiments can have access to a comprehensive image as opposed to merely the distinctions between successive frames. In an embodiment, the degree of similarity between frames compared to the comprehensive image can be determined utilizing computer vision techniques. When a high degree of resemblance is detected, for instance, a similarity index of 70%, 80%, 90%, 95% or another predefined threshold, denoted as X %, the system can opt to skip the authentication of that particular key frame.

Embodiments described herein provide various advantages. The system is based on the consideration that during video conferences, the background and the physical appearance of a speaker tend to remain fairly consistent, implying that drastic changes are not a frequent occurrence. Thus, by authenticating only the key frames where substantial variations are noted, the system can economize on the computational resources and efforts directed towards the verification process, while still maintaining a robust defence against potential tampering.

By focusing on key frames and setting a predefined similarity index, the system not only ensures security but also optimizes the process by avoiding unnecessary validations, thereby ensuring a seamless and secure video conferencing experience. The system, thus, intelligently differentiates between significant and minor changes, establishes a secure yet efficient mechanism to safeguard the integrity of the video stream.

Figure 2:
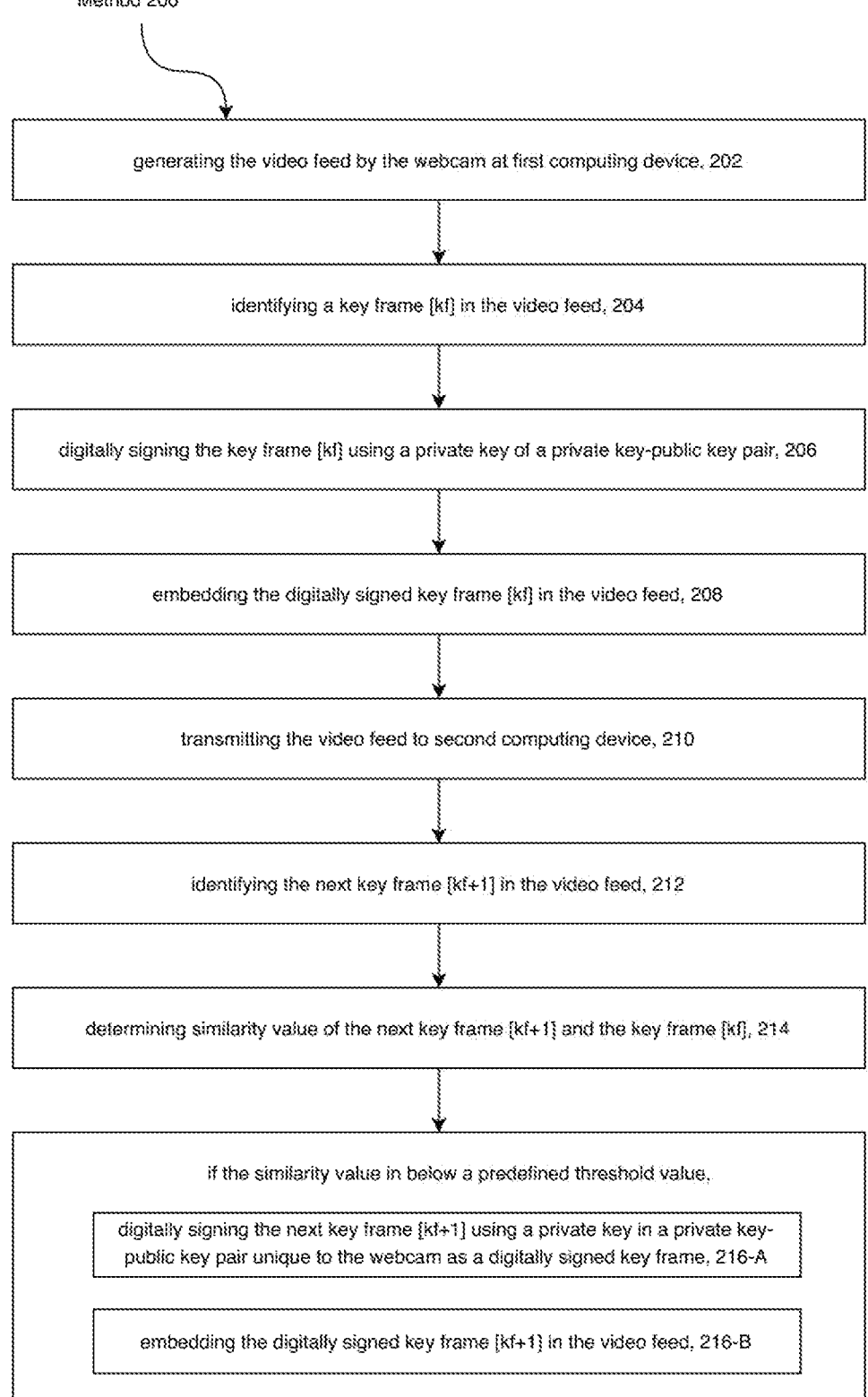
FIG. 2 is a flowchart of a method for protecting a video feed in real-time, in accordance with an embodiment.

FIG. 2 is a flowchart of a method 200 for protecting the authenticity and integrity of a video feed generated by a video capturing device 106 (e.g. a webcam) in real-time, in accordance with one embodiment. The video feed generated includes a sequence of frames. The sequence of frames include key frames and differential frames within the sequence. Each key frame includes an entire image segment.

At 202, the method 200 includes generating the video feed by the video capturing device 106 at first computing device 101. The video capturing device 106, such as a webcam, is configured to capture a video and transmit the video content to the first computing device 101.

At 204, the method 200 includes identifying a key frame [kf] in the video feed. In an embodiment, the key frame is a frame where a change in an image can be identified.

At 206, the method 200 includes digitally signing the key frame [kf] using a private key of a private key-public key pair. The private key-public key pair is unique to the video capturing device 106. The pair can be generated by the manufacturer of the video capturing device 106.

At 208, the method 200 includes embedding the digitally signed key frame [kf] in the video feed.

At 210, the method 200 includes transmitting the video feed to second computing device 116. The second computing device 116 can be a single device or a plurality of devices connected to the first computing device 101 over a network 115.

At 212, the method 200 includes identifying the next key frame [kf+1] in the video feed by a signature verification module 122 of the second computing device 116. The method is configured to analyze the successive key frames.

At 214, the method 200 includes determining similarity value of the next key frame [kf+1] and the key frame [kf] by the signature verification module 122 of the second computing device 116. The similarity value is compared with a predefined threshold value.

At 216, the method 200 includes, if the similarity value in below a predefined threshold value, digitally signing the next key frame [kf+1] using a private key in a private key-public key pair unique to the webcam 106 as a digitally signed key frame, an embedding the digitally signed key frame [kf+1] in the video feed.

In one aspect, the method operations of identification and verification of successive key frames are repeated until the end of the video feed from the webcam 106.

In one aspect, if the similarity value of the next key frame [kf+1] and the key frame [kf] is above the predefined threshold value, a next-to-next key frame [kf+2] in the video feed is identified. Then, a similarity value of the next-to-next key frame [kf+2] and the key frame [kf] is determined. If the similarity value is below the predefined threshold, the method 200 includes digitally signing the next-to-next key frame [kf+2] using a private key in a private key-public key pair unique to the webcam as a digitally signed key frame and embedding the digitally signed key frame [kf+2] in the video feed.

In one aspect, if the similarity value of the next key frame [kf+1] and the key frame [kf] is above the predefined threshold value, the method includes repeating digitally signing, embedding, transmitting and identifying the next key frame for the next key frame [kf+1] as the key frame [kf].

Figure 3:
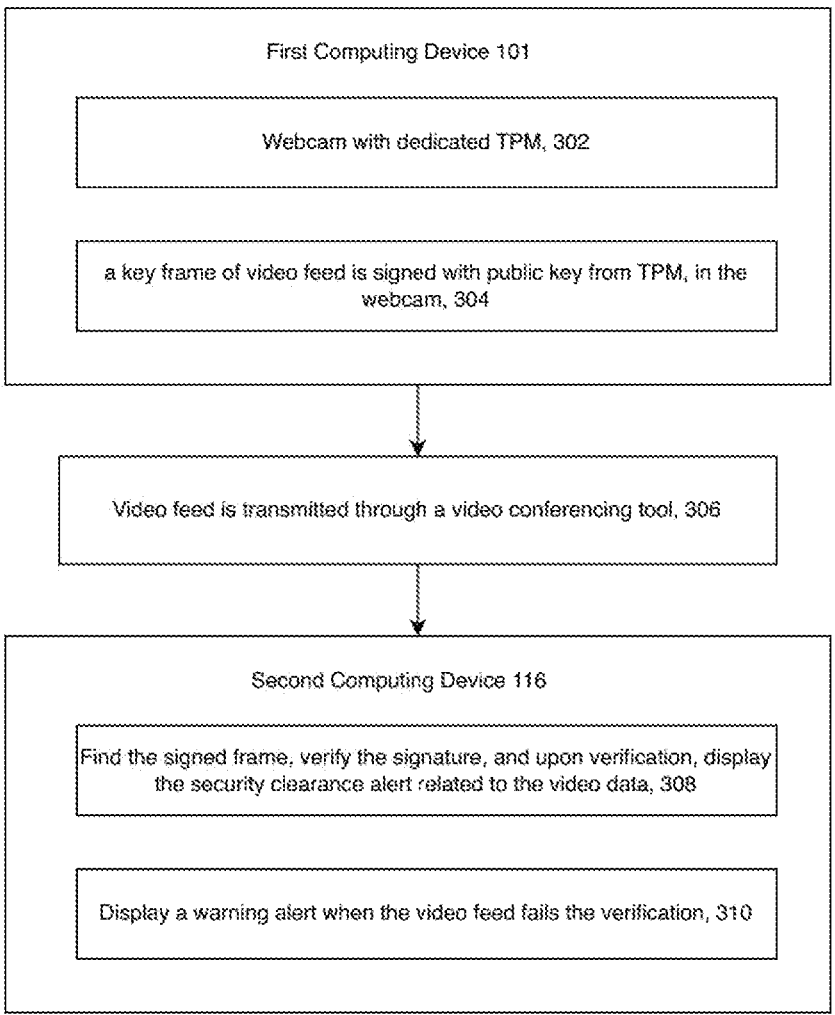
FIG. 3 is a flowchart of operations in implementation of a system for protecting a video feed in real-time, in accordance with an embodiment.

FIG. 3 is a flowchart of operations involved in implementation of the system for protecting an authenticity and integrity of a video feed generated by a video capturing device 106 (e.g. webcam) in real-time, in accordance with one embodiment. As described with reference to FIG. 1B, the system includes the first computing device 101 and the second computing device 116. The first computing device 101 is implemented at a speaker's side, including a webcam with the TPM 108. At 302, the webcam is initiated to capture the video content. At 304, the TPM 108 adds security measures within the video content, such as digital signatures in the key frames. The digital signature is added using a public key from a public key private key pair unique to the webcam.

The video content, having the key frame signed, is then transmitted to the second computing device 116 through the video conferencing platform 110, at 306.

A signature verification module 122 of the second computing device 116, at 308, identifies the signed key frame, verifies the signature, and upon verification, displays the security clearance alert pertaining to the video content.

If the video content fails the security verification, a warning alert is displayed on the second computing device 116, at 310.

The invention claimed is:

1. A method for protecting a video feed, the video feed including a sequence of frame images and a plurality of key frames within the sequence, the method comprising:

generating the video feed by a webcam operably coupled to a first computing device;

identifying a key frame [kf] in the video feed, each of the plurality of key frames including an entire image segment for a particular moment in time, wherein the video feed further comprises a plurality of differential frames occurring between the plurality of key frames and including data for the parts of the image that have changed since a previous frame, wherein the key frame [kf] is identified by:

using a library of a user appearance profile, the library stored in memory operably coupled to the first computing device; and a trigger event including at least one of:

a first appearance of a user in the video feed, a timer, a detection of a voice of the user, turning on the webcam in a conference call, a trigger of a video conferencing platform, or a randomly selected time interval from the start of the video feed;

digitally signing the key frame [kf] using a private key of a private key-public key pair, wherein the private key-public key pair is unique to the webcam;

embedding the digitally signed key frame [kf] in the video feed;

transmitting the video feed to a second computing device;

identifying the next key frame [kf+1] in the video feed;

determining a similarity value of the next key frame [kf+1] and the key frame [kf]; and when the similarity value is below a predefined threshold value, digitally signing the next key frame [kf+1] using a private key in the private key-public key pair unique to the webcam as a digitally signed key frame, and embedding the digitally signed key frame [kf+1] in the video feed, wherein the similarity value is calculated only on successive key frames and wherein the similarity value being below the predefined threshold value precludes at least one digital signing and embedding of a subsequent key frame to the key frame.

2. The method of claim 1, further comprising:

repeating the identifying the next key frame [kf+1], the determining the similarity value of the next key frame [kf+1] and the key frame [kf], and the digitally signing the next key frame [kf] and the embedding the digitally signed key frame [kf+1] when the similarity value is below a predefined threshold value until the end of the video feed from the webcam.

3. The method of claim 1, further comprising:

when the similarity value of the next key frame [kf+1] and the key frame [kf] is above the predefined threshold value, identifying a next-to-next key frame [kf+2] in the video feed; and determining a further similarity value of the next-to-next key frame [kf+2] and the key frame [kf]; and when the further similarity value is below the predefined threshold, digitally signing the next-to-next key frame [kf+2] using a private key in the private key-public key pair unique to the webcam as a digitally signed key frame, and embedding the digitally signed key frame [kf+2] in the video feed.

4. The method of claim 1, wherein when the similarity value of the next key frame [kf+1] and the key frame [kf] is above the predefined threshold value, identifying a next-to-next key frame [kf+2], and digitally signing and embedding the next-to-next key frame [kf+2] when a further similarity value is below the predefined threshold value for the next-to-next key frame [kf+2].

5. The method of claim 1, wherein the embedding comprises incorporating the digitally signed key frame [kf] into metadata of the video feed.

6. The method of claim 1, wherein the embedding comprises incorporating the digitally signed key frame [kf] into the key frame [kf].

7. The method of claim 1, further comprising:

locating the digitally signed key frame within the video feed;

extracting the public key from the private key-public key pair from the digitally signed key frame; and verifying the digital signature of the digitally signed key frame using the public key.

8. The method of claim 1, further comprising repeating the identifying the next key frame [kf+1], the determining the similarity value of the next key frame [kf+1] and the key frame [kf], and the digitally signing the next key frame [kf] and the embedding the digitally signed key frame [kf+1] until a predefined counter reaches a maximum limit.

9. The method of claim 1, wherein the similarity value is determined by using at least one of:

a Structural Similarity Index (SSI), a Mean Squared Error (MSE), a histogram comparison, a template matching, a SIFT (Scale-Invariant Feature Transform) technique, a SURF (Speeded-Up Robust Features) technique, or a deep learning Convolutional Neural Network (CNN).

10. The method of claim 1, wherein the predefined threshold is defined based on at least one of:

a security setting of a video conference platform;

a personal setting of a user;

a current computational load;

a security requirements of the video conference platform;

feedback from initial testing and user experience;

a nature of the conference call; or a request from another participant through the video conferencing platform.

11. The method of claim 1, the predefined threshold value is dynamically defined by a machine learning technique based on at least one of:

an availability of memory resources within a system on which a video conference platform is executing;

a current utilization of system resources;

a processing speed requirement a latency requirement;

a security setting of the video conference platform;

a personal settings of a user;

a security requirement of the video conference platform;

feedback from initial testing and user experience;

a characteristic of an image in the video feed; or an available network bandwidth.

12. A system for protecting a video feed, comprising:

a webcam configured to generate a video feed comprising a sequence of frame images and key frames;

a Trusted Platform Module (TPM) integrated with the webcam and operably coupled to at least one processor, and including instructions stored in memory that, when executed on the at least one processor, cause the at least one processor to:

securely store a unique private key-public key pair, identify a key frame [kf] in the video feed, the key frame including an entire image segment for a particular moment in time, wherein the video feed further comprises a plurality of differential frames occurring between the key frame [kf] and the next key frame [kf+1] and including data for the parts of the image that have changed since a previous frame, wherein the key frame [kf] is identified by:

using a library of a user appearance profile, the library stored in memory; and a trigger event including at least one of:

a first appearance of a user in the video feed, a timer, a detection of a voice of the user, turning on the webcam in a conference call, a trigger of a video conferencing platform, or a randomly selected time interval from the start of the video feed, digitally sign the key frame [kf] using the private key, and embed the signed key frame [kf] in the video feed;

instructions stored in memory that, when executed on the at least one processor, cause the at least one processor to:

transmit the video feed to a second computing device having second communication module to receive the video feed, identify the next key frame [kf+1] in the video feed, determine a similarity value of the next key frame [kf+1] and the key frame [kf], and when the similarity value is below a predefined threshold value, digitally sign the next key frame [kf+1] using the private key, and embed the digitally signed key frame [kf+1] in the video feed, wherein the similarity value is calculated only on successive key frames and wherein the similarity value being below the predefined threshold value precludes at least one digital signing and embedding of a subsequent key frame to the key frame.

13. The system of claim 12, wherein instructions further cause the at least one processor to determine the similarity value between successive key frames and sign and embed a particular subsequent key frame [kf] based on a comparison of the similarity value and the predefined threshold value.

14. The system of claim 12, wherein the TPM is configured to embed the digitally signed key frame into the metadata of the video feed.

15. The system of claim 12, wherein the TPM is configured to embed the digitally signed key frame into the key frame [kf].

16. The system of claim 12, wherein the instructions further cause the at least one processor to:

locate and extract the digitally signed key frame [kf];

extract the public key associated with the webcam; and verify the digital signature of the key frame using the extracted public key.

17. The system of claim 12, wherein the instructions further cause the at least one processor to modify at least one of:

a frequency of signed frames;

an embedding method for the digital signature; and a predefined similarity threshold.

18. The system of claim 12, wherein the predefined threshold value is dynamically defined by a machine learning technique based on at least one of:

an availability of memory resources within the system;

a current utilization of system resources;

a processing speed requirement;

a latency requirement;

a security setting of a video conference platform;

a personal setting of a user;

a specific security requirement of the video conference platform;

feedback from initial testing and user experience;

a characteristic of an image in the video feed; or an available network bandwidth.

19. The system of claim 12, wherein the instructions further cause the at least one processor to: repeat the identifying the next key frame [kf+1], the determining the similarity value of the next key frame [kf+1] and the key frame [kf], and the digitally signing the next key frame [kf] and the embedding the digitally signed key frame [kf+1] when the similarity value is below a predefined threshold value until the end of the video feed from the webcam.

20. The system of claim 12, wherein the instructions further cause the at least one processor to: repeat the identifying the next key frame [kf+1], the determining the similarity value of the next key frame [kf+1] and the key frame [kf], and the digitally signing the next key frame [kf] and the embedding the digitally signed key frame [kf+1] until a predefined counter reaches a maximum limit.

\* \* \* \* \*